Figure 1:
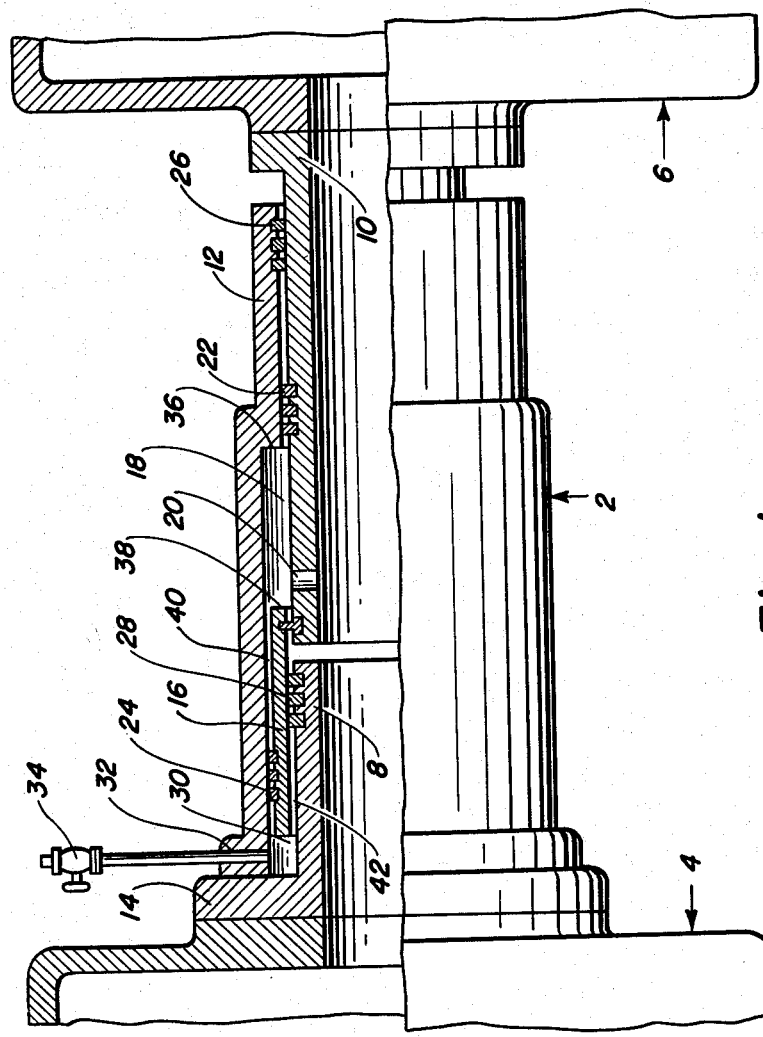

May 18, 1965 R. MICHEL 3,183,936
EXPANSION JOINT
Filed May 31, 1963

INVENTOR.
Rudolph Michel
BY
Roland A. Anderson
Attorney 3,183,936
EXPANSION JOINT
Rudolph Michel, Hyattsville, Md., assignor to the United States of America as represented by the United States Atomic Energy Commission
Filed May 31, 1963, Ser. No. 284,763
2 Claims. (Cl. 137—802)

This invention relates to an expansion joint in a system carrying a fluid under pressure, and more particularly to an expansion joint which eliminates end thrust due to thermal expansion and fluid pressure, or limits the thrust to a desired amount.

Flexibility may be required in a pipe line for a fluid under pressure to compensate for end thrust imparted to the line by thermal expansion of the line and by pressure exerted by the fluid being carried. A sliding type expansion joint is, in many instances, the most appropriate means for introducing the desired flexibility.

It is an object of the present invention to provide an improved expansion joint of the sliding type in which end thrust is eliminated or limited to a desired amount.

This object is accomplished by the following invention which is a sliding type expansion joint in which end thrust is equalized within the joint by use of a balance chamber pressurized by the transported fluid, a leak-off reservoir in which the pressure may be varied, and a pressure regulating valve for controlling the pressure in the leak-off reservoir.

This and other objects and advantages of the invention will become more readily apparent and understood from the accompanying specification and drawing in which:

FIGURE 1 is a side elevation, partly in section, of the improved expansion joint having self-contained thrust limiting or thrust elimination provision.

In the embodiment of the invention as shown in the drawing, the expansion joint 2 connects pressure vessels 4 and 6. Inner sleeve 8 is bolted to pressure vessel 4 and inner sleeve 10 is bolted to pressure vessel 6. Outer sleeve 12 is bolted to the flange 14 of inner sleeve 8. Inner sleeve extension 16 is connected to inner sleeve 10 and is slidably disposed between inner sleeve 8 and outer sleeve 12. Balance chamber 18 is defined by inner sleeve 10, inner sleeve extension 16 and outer sleeve 12 and is in communication with the inner space of the joint by means of a plurality of holes 20 through inner sleeve 10. Sealing rings 22, 24, 26 and 28 limit escape of fluid. Leak-off reservoir 30 is defined by inner sleeve 8, including inner sleeve flange 14, inner sleeve extension 16, and outer sleeve 12. Leak-off reservoir 30 is a receptacle for fluid leaking past outer sealing rings 24 and inner sealing rings 28, and so is in leakage communication with the balance chamber 18 through outer channel 40 and with the interior of the joint through inner channel 42. Leak-off reservoir 30 is in communication with the outside of the joint through tube 32. Escape of fluid from tube 32 is controlled by valve 34 which may be set to discharge at a predetermined pressure and so control the pressure in leak-off reservoir 30.

The material from which the sealing rings 22, 24, 26 and 28 are made is chosen to suit the type of fluid to be contained, its temperature and pressure, and the operating conditions. Examples of materials used with success include elastomers, where radioactive fluids are conveyed, metal alloys including chromium or nickel, where corrosive fluids are conveyed, stainless steel rings, where high strength and corrosion resistance are required. The metal alloys may contain free flake graphite to act as a lubricant. Elastomer and alloy sealing rings in combination have been used with success.

In operation, the pressure of the fluid being carried by the pipeline tends to force the inner sleeves 8 and 10 apart. However, this same fluid pressure acts upon surface 36 of outer sleeve 12 and upon surface 38 of inner sleeve extension 16. Suitable proportioning of the various surface areas is well known in the art. Leakage of fluid past outer sealing rings 24 and inner sealing rings 28 provides for a pressure in leak-off reservoir 30 essentially equal to the pressure in the line and in balance chamber 18, assuming that valve 34 is closed. By changing the setting of valve 34, the pressure in leak-off reservoir 30 can be regulated, thereby changing the end thrust to a desired amount. Maximum end thrust can be achieved by closing valve 34 and conversely, end thrust can be reduced to a minimum by opening valve 34.

The present invention provides a flexible slip type expansion joint, suitable for use in a system carrying a fluid under pressure, which expansion joint admits of end thrust limiting or elimination.

It will be understood that the above described embodiment of the invention is illustrative only and modifications thereof will occur to those skilled in the art. Therefore, the invention is not to be limited to the specific apparatus disclosed herein, but is to be defined by the appended claims.

What is claimed is:
1. A regulated thrust limiting expansion joint in a system carrying a fluid under pressure comprising:
   an inner sleeve,
   a second inner sleeve in opposed axial alignment with the first inner sleeve and separated therefrom,
   a flange integral with the second inner sleeve and remote from the first inner sleeve,
   an inner sleeve extension attached to the first inner sleeve and slidably disposed concentrically about the second inner sleeve and spaced from said flange,
   an outer sleeve attached to the flange and slidably disposed concentrically about the first inner sleeve, inner sleeve extension and the second inner sleeve,
   inner sealing rings attached to the exterior of the second inner sleeve and in slidable contact with the interior of the inner sleeve extension,
   outer sealing rings attached to the exterior of the inner sleeve extension and in slidable contact with the interior of the outer sleeve,
   the first inner sleeve, the inner sleeve extension and the outer sleeve defining a balance chamber,
   the first inner sleeve having at least one hole extending from the balance chamber to the interior of the first inner sleeve,
   the second inner sleeve, including the flange, the inner sleeve extension and the outer sleeve defining a leak-off reservoir,
   the inner sleeve extension and the outer sleeve forming an outer channel means extending from the balance chamber to the leak-off reservoir for transmitting fluid from said balance chamber to said leak-off reservoir, said outer channel partially obstructed by the outer sealing rings,
   the inner sleeve extension and the second inner sleeve forming an inner channel means extending from the interior of the inner sleeve and the second inner sleeve to the leak-off reservoir for transmitting fluid from said interior to said leak-off reservoir, said inner channel partially obstructed by the inner sealing rings,
   and a variable pressure regulating means vented to the exterior of said expansion joint communicating with said leak-off reservoir for controlling the rate of separation of said opposed axial alignment of said spaced inner sleeve and second inner sleeve, by control of fluid vented to said exterior by said regulating means.

2. A regulated thrust limiting expansion joint in a system carrying a fluid under pressure comprising:
   an inner sleeve,
   a second inner sleeve in opposed axial alignment with the first inner sleeve and separated therefrom,
   a flange integral with the second inner sleeve and remote from the first inner sleeve,
   an inner sleeve extension attached to the first inner sleeve and slidably disposed concentrically about the second inner sleeve and spaced from said flange,
   an outer sleeve attached to the flange and slidably disposed concentrically about the first inner sleeve, inner sleeve extension and the second inner sleeve,
   inner sealing rings attached to the exterior of the second inner sleeve and in slidable contact with the interior of the inner sleeve extension,
   outer sealing rings attached to the exterior of the inner sleeve extension and in slidable contact with the interior of the outer sleeve,
   the first inner sleeve, the inner sleeve extension and the outer sleeve defining a balance chamber,
   the first inner sleeve having at least one hole extending from the balance chamber to the interior of the first inner sleeve,
   the second inner sleeve, including the flange, the inner sleeve extension and the outer sleeve defining a leak-off reservoir,
   the inner sleeve extension and the outer sleeve forming an outer channel means extending from the balance chamber to the leak-off reservoir for transmitting fluid from said balance chamber to said leak-off reservoir, said outer channel partially obstructed by the outer sealing rings,
   the inner sleeve extension and the second inner sleeve forming an inner channel means extending from the interior of the inner sleeve and the second inner sleeve to the leak-off reservoir for transmitting fluid from said interior to said leak-off reservoir, said inner channel partially obstructed by the inner sealing rings,
   the outer sleeve having a conduit extending from the leak-off reservoir to the atmosphere,
   and a variable pressure regulating valve means vented to the exterior of said expansion joint communicating with said conduit for controlling the rate of separation of said opposed axial alignment of said spaced inner sleeve and second inner sleeve, by control of fluid vented to said exterior by said regulating valve means.

References Cited by the Examiner

UNITED STATES PATENTS

| 327,281 | 9/85 | Letzkus | 285—302 XR |
| 915,502 | 3/09 | Struer | 285—302 |
| 943,904 | 12/09 | Struer | 285—302 XR |

FOREIGN PATENTS

| 254,467 | 7/26 | Great Britain. |

M. CARY NELSON, *Primary Examiner.*

MARTIN P. SCHWADRON, *Examiner.*